A. L. NYE.
CONTINUOUS PRESSURE GAGE.
APPLICATION FILED AUG. 5, 1919.
1,377,220.   Patented May 10, 1921.
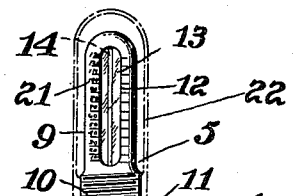
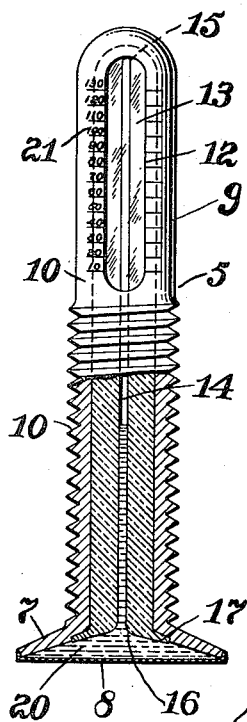
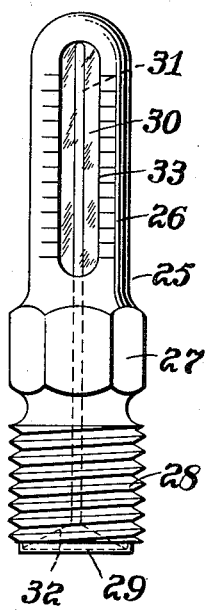
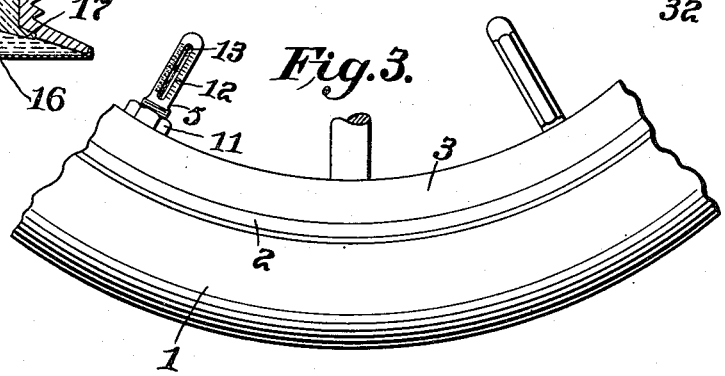
Inventor:
Alfred L. Nye,
by Parker Cook
Atty.

UNITED STATES PATENT OFFICE.

ALFRED L. NYE, OF GIBSON, NEW MEXICO.

CONTINUOUS-PRESSURE GAGE.

1,377,220.   Specification of Letters Patent.   Patented May 10, 1921.

Application filed August 5, 1919.   Serial No. 315,458.

*To all whom it may concern:*

Be it known that I, ALFRED L. NYE, a citizen of the United States, residing at Gibson, in the county of McKinley and State of New Mexico, have invented certain new and useful Improvements in Continuous-Pressure Gages, of which the following is a specification.

My invention relates to a new and useful improvement in continuous pressure gages adapted to be permanently secured to the tire rim and wheel of an automobile and the gage so arranged and constructed that an elastic or resilient diaphragm on the inner end thereof will be in constant contact with the inner tube of the tire so that the pressure per square inch in the tire will be exerted on the diaphragm and in turn will force an indicator a certain height in the gage which gage is carefully graduated so that the pressure of the air in the tire may be quickly read on the graduated scale of the gage.

As is well known it is desirable to keep a certain amount of pressure in automobile tires depending on the cross section of the same and the weight to be carried, and the present practice of determining this pressure is to place a gage for a moment on the air valve then remove the gage and replace the air valve cap.

However, it often happens that the air gage can not be found if having been lost or misplaced and the amount of air put in the tire or the amount of air already therein is simply guessed at, and the tendency is to an under inflation which is detrimental to the tire.

An object of the present invention, therefore, is to so construct a gage that it may be applied to the tire rim, the inner end of the gage extending therethrough so that a resilient diaphragm thereon will be in constant contact with the inner tube at a place between the two edges of the shoe and the pressure per square inch will cause a like pressure on the diaphragm which in turn actuates an indicator, so that the position of the same may be quickly and easily read on a graduated pressure scale near the top of the gage.

Another object of the invention is to so form the gage that although the pressure of the inner tube may cause but a slight movement of the diaphragm the movement of the indicator in the tube will be much greater and may be easily seen and noted along the graduated scale.

Still another object of the invention is to so construct the gage that it may be easily fastened to any tire rim, and may be removed if the occasion should require it.

Furthermore, the use of the constant pressure gage will not in any way interfere with the removal of the tire or the placing on of another one.

With these and other objects in view my invention consists in certain new and novel constructions and combinations of parts as will be hereinafter more fully described and pointed out in the claims.

In the drawings—

Figure 1 is a sectional view of a tire and rim and the gage in its proper position;

Fig. 2 is a view partly in elevation and partly in section of a preferred form of gage;

Fig. 3 is a fragmentary view of a tire and felly of a wheel and showing the gage as it will appear when applied;

Fig. 4 shows a slightly modified form of the gage.

Referring now to the drawings and to Fig. 1, in particular there is shown a tire 1, secured on a demountable rim 2, which rim in turn fits on the wheel felly 3, and through this felly is an opening 4, through which is passed the gage 5. An opening 6, is also formed in the tire rim 2, which opening has the beveled side walls 6 so that a flared portion 7, of the gage will snugly fit within the same and a resilient diaphragm 8 on the end of the gage, to be hereinafter mentioned, will lie flush with the inner surface of the tire rim 2.

Referring now to the construction of the gage 5 and clearly shown in Fig. 2, it will be seen that it consists of a metal casing or tube 9, which is provided with the external screw threads 10 which extend about half its length and on which travels the lock nut 11.

The upper portion of the metal tube or casing 9, is provided with a slot-like opening through which may be seen a glass tube 13 which snugly fits within the casing or tube 9, and is formed of comparatively thick glass, and which tube has the relatively small passageway 14, which is sealed at the top 15, but open at the bottom as at 16.

This tube 13 is slightly flared at its open end as at 17, to form a liquid tight joint with the casing or tube 9.

Any suitable cement or glue may be used to tightly hold the tube 13 in its proper relation within the tube 9, and after once assembled, must not be moved unless, of course, it should become broken when a new one may be inserted.

Over the flared portion 7 of the casing or tube 9 heretofore mentioned, is clamped or otherwise suitably fastened a resilient diaphragm 8 which may be of metal or other suitable elastic material, which as before mentioned lies flat with the inner surface of the tire rim 2, when the gage is in its functioning position and against which bears the inner tube 18.

Before this diaphragm, however, is clamped to the lower end of the casing 9, an indicator is placed in the gage to be operated by the resilient diaphragm and in the present instance a column of liquid 20 is employed which is placed in the pocket or chamber 19 formed by the flared edges of an end wall 7 and the end of the tube 13, and I have found that an oil which may or may not be colored makes a suitable liquid for this purpose.

It is to be understood, however, that other forms of suitable indicators might be used in conjunction with the diaphragm providing that they are always in contact with the diaphragm and are actuated by the movement of said diaphragm.

Referring again to the drawings it will be noticed that the metal casing of the gage 5 is proportionately graduated and the graduations are marked opposite the openings 12 as shown at 21.

Of course, the amount of liquid 20 shown in the pocket or chamber 19 has to be carefully determined so that the amount of liquid displaced by the movement of the resilient diaphragm will be in a certain known ratio that the height of the gage bears to the pressure per square inch in the inner tube. In other words, the volume of liquid displaced say by forty pounds pressure on the diaphragm 8 must cause the liquid to rise in the passage 14 until it comes opposite the graduation mark 40 on the casing, and in a like manner the proportions remain throughout the range of the gage.

By having the passage 14 sealed at its upper end a compression is formed in the passage 14, which of course, prevents too great a movement of the diaphragm 8.

A cap 22 may be threaded on the upper portion of the gage 5 if found desirable.

From the foregoing it will be seen that with the gage formed as shown and applied to an automobile wheel and rim with the diaphragm in constant contact with the inner tube the pressure in the tire can be ascertained at any moment without stopping to get out a gage and applying it to the valve stem of the inner tube, and by having the gage always in place there is no danger of misplacing the same and in that way often neglecting to ascertain if the correct amount of air is in the tube.

I have shown the application in this instance to a wheel fitted with a demountable rim but it might be as easily applied to the clencher form of tire without in any way changing the construction.

The gage is one that may be easily applied and in no way interferes with the removal of the tire or the applying of another, the lock nut simply being removed and the gage removed with the rim when the same is demounted, the only preparation necessary for the application of the gage being to form the opening in the felly of the wheel and the opening in the tire rim.

Also as heretofore mentioned other changes might be made in the form of gage used with the tire for continuous pressure readings just so the amount of pressure on the diaphragm may be read along the graduated scale and I do not wish to be limited to the exact form of gage shown.

Referring now to a modification of the gage as shown in Fig. 4, the exterior is somewhat changed so that the gage 25 may be inserted in the openings in an engine in which the spark plugs are normally situated, so that the compression in the cylinder may be determined by turning the engine crank until the compression stroke is arrived at in the cylinder in which the gage is located, the pressure acting on the diaphragm to raise the indicating means in the gage.

In this instance the gage has the casing 26, with the hexagonal nut 27 formed near the lower portion thereof, the lower end externally threaded at 28, to screw into a spark plug hole in a cylinder, and the diaphragm 29 suitably clamped to the lower end of the casing 26.

A glass tube 30, is cemented in the casing, having the passageway 31, which is sealed at the top and open at the bottom, and the length of the tube 30 is such that a small liquid chamber 32 is formed near the lower end of the casing 26. This is filled with liquid and the graduations are formed in the upper part of the casing exactly as in the preferred form. A slot 33 makes it possible to read the height of the liquid in the passageway 31, and the figures marked on the scale give the pressure in pounds in the cylinder.

Of course, a stronger diaphragm may be necessary and the scale may have to be in larger numbers but this is a matter of detail and does not in any way depart from the structure or principle of the gage.

Having thus described my invention what

I claim as new and desire to secure by Letters Patent is:—

1. A pneumatic tire pressure gage comprising a one-piece hollow body portion, a transparent tube in said body portion, the upper part of the body having a cut-out portion with graduations marked opposite the same, a pliable diaphragm presenting a plane surface and secured around its edge to the end of the body portion and normally lying in a plane coincident with the plane in which the end of the body lies, and a liquid in said tube and body portion and adapted to rise and fall to register the pressure exerted on said diaphragm.

2. A pressure gage comprising a one-piece hollow body portion, the lower end of said body portion being flared to form a pocket, a transparent tube tightly fitting within said body portion and having its lower end flared to snugly fit within the upper portion of said pocket formed in said body portion, the upper portion of said body being cut out and graduations marked opposite the said cut-out portion, a pliable diaphragm secured to the lower end of said body portion presenting a plane surface and forming the bottom wall of said aforementioned pocket, a liquid of determined amount in said pocket and adapted to rise and fall in said tube depending upon the amount of pressure exerted on said pliable diaphragm.

In testimony whereof I affix my signature.

ALFRED L. NYE.